(12) United States Patent
Ikegaya et al.

(10) Patent No.: US 11,179,866 B2
(45) Date of Patent: Nov. 23, 2021

(54) PARISON SEPARATION DEVICE, BLOW MOLDING MACHINE, AND METHOD FOR MANUFACTURING BLOW-MOLDED ARTICLE

(71) Applicant: THE JAPAN STEEL WORKS, LTD., Tokyo (JP)

(72) Inventors: Masanosuke Ikegaya, Yokohama (JP); Yuji Hisatomi, Yokohama (JP); Shoji Abe, Yokohama (JP); Toshiaki Shinmoto, Yokohama (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 235 days.

(21) Appl. No.: 16/476,102

(22) PCT Filed: Aug. 18, 2017

(86) PCT No.: PCT/JP2017/029620
§ 371 (c)(1),
(2) Date: Jul. 4, 2019

(87) PCT Pub. No.: WO2018/150610
PCT Pub. Date: Aug. 23, 2018

(65) Prior Publication Data
US 2019/0351583 A1    Nov. 21, 2019

(30) Foreign Application Priority Data
Feb. 17, 2017    (JP) .............................. JP2017-027648

(51) Int. Cl.
*B29C 49/04*    (2006.01)
*B29B 11/02*    (2006.01)
(Continued)

(52) U.S. Cl.
CPC .............. *B29B 11/02* (2013.01); *B29C 49/04* (2013.01); *B29C 31/08* (2013.01); *B29C 49/42* (2013.01); *B29C 51/02* (2013.01); *B29C 51/26* (2013.01)

(58) Field of Classification Search
None
See application file for complete search history.

(56) References Cited

U.S. PATENT DOCUMENTS

| 2001/0015513 A1 | 8/2001 | Schaftingen et al. |
| 2006/0099290 A1 | 5/2006 | Rohde et al. |

(Continued)

FOREIGN PATENT DOCUMENTS

| DE | 20 2006 013751 U1 | 11/2006 |
| EP | 1 728 669 A2 | 6/2006 |

(Continued)

OTHER PUBLICATIONS

International Search Report from International Patent Application No. PCT/JP2017/029620, dated Sep. 19, 2017.

(Continued)

*Primary Examiner* — Monica A Huson
(74) *Attorney, Agent, or Firm* — SGPatents PLLC

(57) ABSTRACT

A parison separation device (30) according to an embodiment includes a cutter (31) with a cutting edge (35), the cutting edge (35) extending in a one direction and facing upward, and a block (33), the cutter being attached to an upper part of the block (33), inclined surfaces (37) being formed on both sides of the block (33) in a thickness direction of the cutting edge (35), each of the inclined surfaces (37) including a component that is inclined increasingly downward as it gets closer to one direction side end, in which the parison separation device (30) is disposed on a discharging direction side of a discharging port of a parison (Continued)

and configured to cut the parison discharged from the discharging port.

18 Claims, 15 Drawing Sheets

(51) Int. Cl.
    *B29C 31/08*     (2006.01)
    *B29C 49/42*     (2006.01)
    *B29C 51/02*     (2006.01)
    *B29C 51/26*     (2006.01)

(56) References Cited

U.S. PATENT DOCUMENTS

2006/0141184 A1\*   6/2006   Rohde ................ B29C 49/0073
                                                                         428/35.7
2014/0065255 A1    3/2014   Araya et al.
2014/0113016 A1    4/2014   Ito et al.
2018/0319069 A1  11/2018   Kondo et al.

FOREIGN PATENT DOCUMENTS

| EP | 1 534 496 B1 | 10/2010 |
|---|---|---|
| JP | H07-156255 A | 6/1995 |
| JP | 2005-532200 A | 10/2005 |
| JP | 2011-168064 A | 9/2011 |
| JP | 5427834 B2 | 2/2014 |
| JP | 5600640 B2 | 10/2014 |
| JP | 2015-080869 A | 4/2015 |
| JP | 2017-007301 A | 1/2017 |
| WO | WO 2017/069011 A1 | 4/2017 |

OTHER PUBLICATIONS

Extended European Search Report dated Nov. 9, 2020, in European Patent Application No. 17896480.5.

\* cited by examiner

PARISON SEPARATION DEVICE, BLOW MOLDING MACHINE, AND METHOD FOR MANUFACTURING BLOW-MOLDED ARTICLE

TECHNICAL FIELD

The present invention relates to a parison separation device, a blow molding machine, and a method for manufacturing a blow-molded article. For example, the present invention relates to a parison separation device that forms a sheet by separating a parison, a blow molding machine that forms a blow-molded article by using a separated parison, and a method for manufacturing a blow-molded article.

BACKGROUND ART

As a method for forming a blow-molded article such as a gasoline tank containing a plastic as its material, a twin-sheet molding method has been known. In the twin-sheet molding method, two sheets are molded by extruding a molten resin and a blow-molded article such as a gasoline tank is formed from the two molded sheets.

In the twin-sheet molding method, since a blow-molded article is formed from two sheets, a component such as a framework can be inserted into a gasoline tank during the forming process. Therefore, it is unnecessary to perform processing for the gasoline tank, such as formation of an insertion opening for inserting a component after forming the gasoline tank and welding of the insertion opening, and it is possible to prevent a leakage of gasoline. Note that in addition to the framework, the component to be inserted into the gasoline tank differs depending on the purpose of the component, such as enhancing the strength of the gasoline tank and preventing gasoline from undulating.

Further, in the twin-sheet molding method, it is possible to reduce the number of post-processes such as formation of an insertion opening and welding of the insertion opening, and thereby to increase the production efficiency and reduce the production cost.

CITATION LIST

Patent Literature

Patent Literature 1: Japanese Patent No. 5427834
Patent Literature 2: Japanese Unexamined Patent Application Publication No. 2017-007301
Patent Literature 3: Japanese Patent No. 5600640

SUMMARY OF INVENTION

Technical Problem

As the twin-sheet molding method, for example, in methods disclosed in Patent Literatures 1 and 2, a molten resin is extruded from a gap between a cylindrical die and a core inserted inside the die, and a parison, which has been molded into a cylindrical shape, is divided into two pieces by a cutter. The cutter is attached in a recessed part provided in the die or the core, and cuts the parison in a resin flow channel located between the die and the core. As described above, in the case of the structure in which the cutter is disposed in the recessed part of the die or the core in the resin flow channel, the resin may leak through the recessed part.

Further, in the twin-sheet molding method disclosed in Patent Literature 1, in order to adjust the thickness of the sheet, a width of the gap between the die and the core is adjusted by vertically moving the core having a truncated cone shape. In order to follow the change in the gap between the die and the core, it is necessary to press the cutter against a wall surface of the die by using a spring or the like, thus making the structure for attaching the cutter complicated.

In a method disclosed in Patent Literature 3, two sheets divided by a cutter are guided to predetermined places by rotating a shaft. In the method disclosed in Patent Literature 3, since the shaft is horizontally disposed below the die and the core, the structure is complicated. Further, there is a problem that wrinkles are formed in the sheets due to the rotation of the shaft.

Other problems to be solved and novel features will become apparent from descriptions in this specification and accompanying drawings.

Solution to Problem

A parison separation device according to an embodiment includes: a cutter with a cutting edge, the cutting edge extending in a one direction and facing upward; and a block, the cutter being attached to an upper part of the block, inclined surfaces being formed on both sides of the block in a thickness direction of the cutting edge, each of the inclined surfaces including a component that is inclined increasingly downward as it gets closer to one direction side end, in which the parison separation device is disposed on a discharging direction side of a discharging port of a parison and configured to cut the parison discharged from the discharging port.

A blow molding machine according to an embodiment includes: a die including a through hole; a core inserted inside the through hole; an extruder configured to extrude a molten resin and thereby supply a parison to a gap between the die and the core; a parison separation device configured to cut and separate the parison discharged from the gap, and thereby form a sheet; and a mold-clamping device configured to form a blow-molded article by using the sheet, in which the parison separation device includes: a cutter with a cutting edge, the cutting edge extending in a one direction and facing upward; and a block, the cutter being attached to an upper part of the block, inclined surfaces being formed on both sides of the block in a thickness direction of the cutting edge, each of the inclined surfaces including a component that is inclined increasingly downward as it gets closer to one direction side end, and the parison separation device is disposed on a discharging direction side of a discharging port of a parison and configured to cut the parison discharged from the discharging port.

A method for manufacturing a blow-molded article according to an embodiment includes the steps of: (A) extruding a molten resin so that the molten resin is discharged as a parison from a gap between a die including a through hole and a core inserted inside the through hole, and cutting the discharged parison; (B) separating the cut parison and forming it into a sheet; (C) performing twin-sheet molding by using the sheet, in which in the step of cutting the parison, a parison separation device is disposed below the die and the core, the parison separation device including: a cutter with a cutting edge, the cutting edge extending in a one direction and facing upward; and a block, the cutter being attached to an upper part of the block, inclined surfaces being formed on both sides of the block in a thickness direction of the cutting edge, each of the inclined surfaces including a component that is inclined increasingly downward as it gets closer to one direction side end.

Advantageous Effects of Invention

According to the embodiment, it is possible to provide a parison separation device, a blow molding machine, and a method for manufacturing a blow-molded article capable of preventing a leakage of a resin and simplifying a structure of a cutter.

DESCRIPTION OF EMBODIMENTS (Embodiments)
<Overall Configuration of Hollow-Molding Machine>

Figure 1:
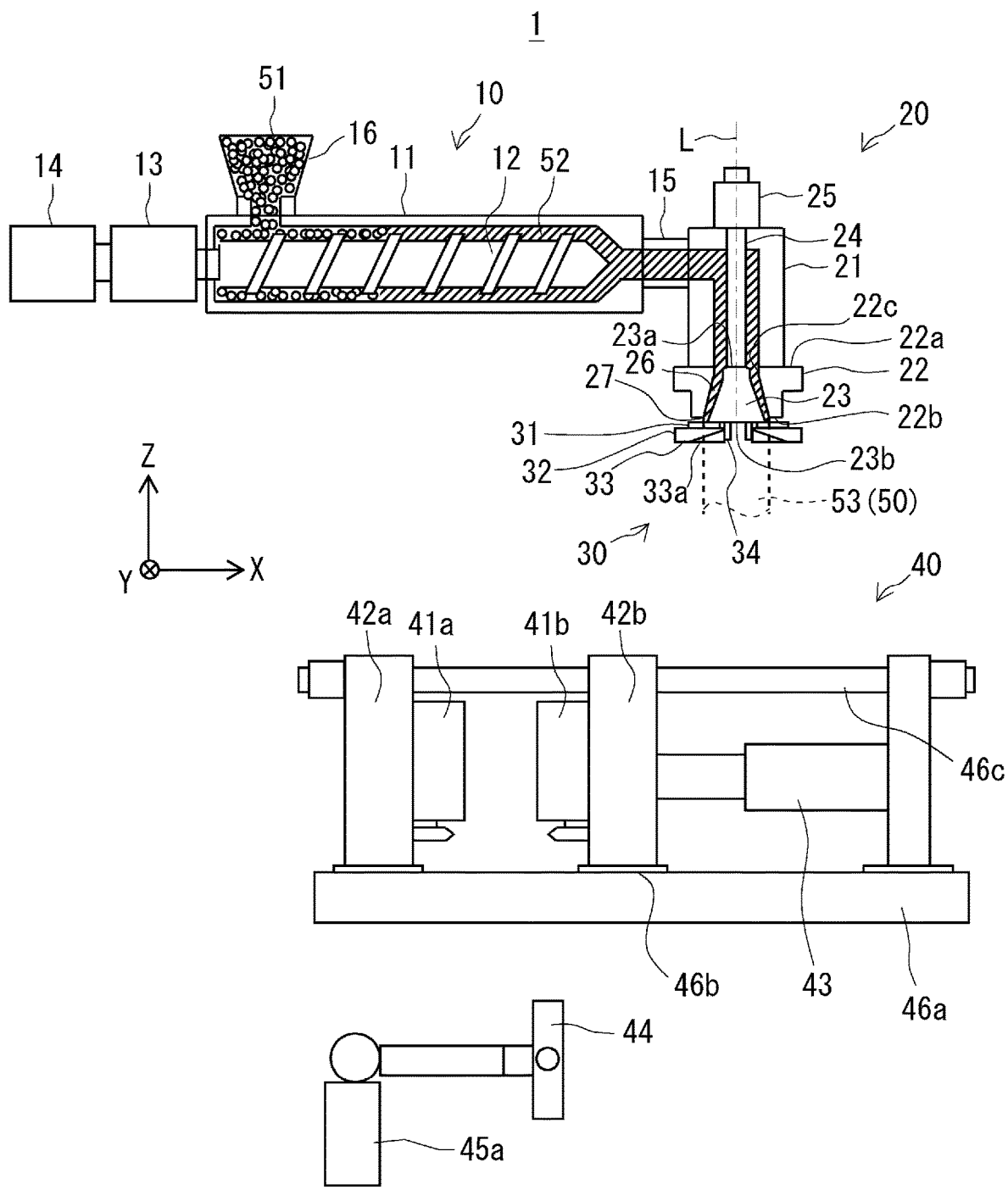
FIG. 1 is a configuration diagram showing an example of a blow molding machine according to an embodiment.
Figure 2A:
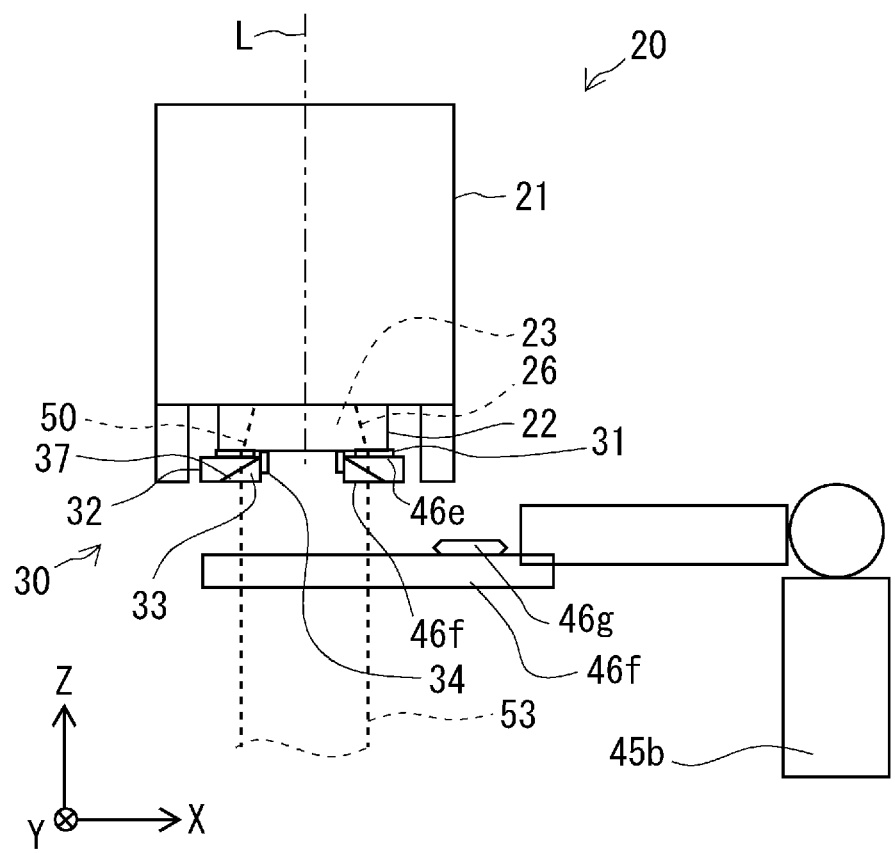
FIG. 2A is a side view showing an example of a head and a parison separation device of a blow molding machine according to an embodiment.
Figure 2B:
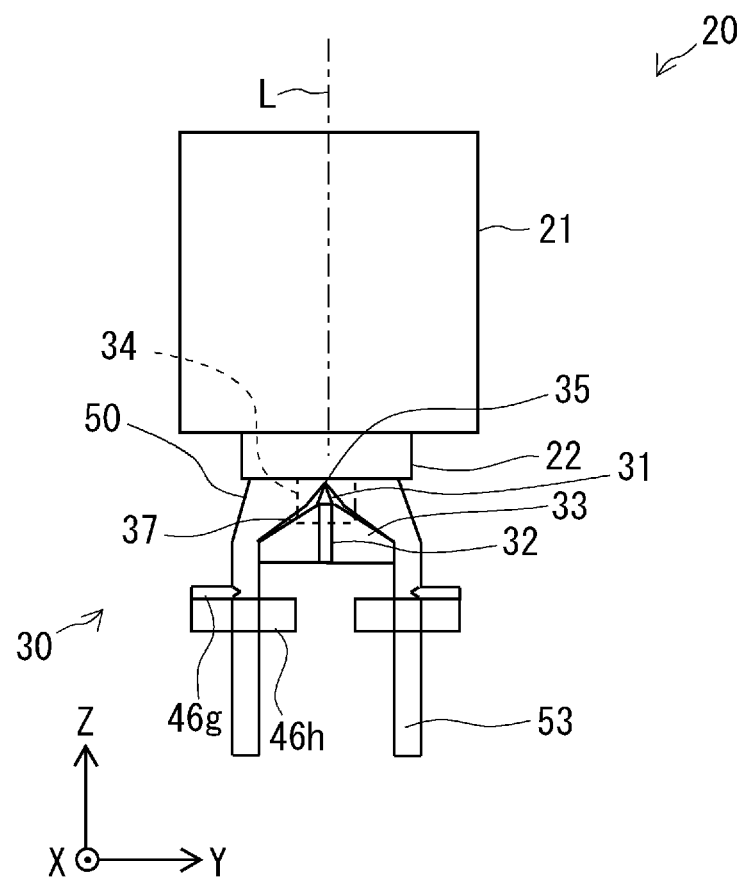
FIG. 2B is a side view showing an example of a head and a parison separation device of a blow molding machine according to an embodiment.
Figure 3:
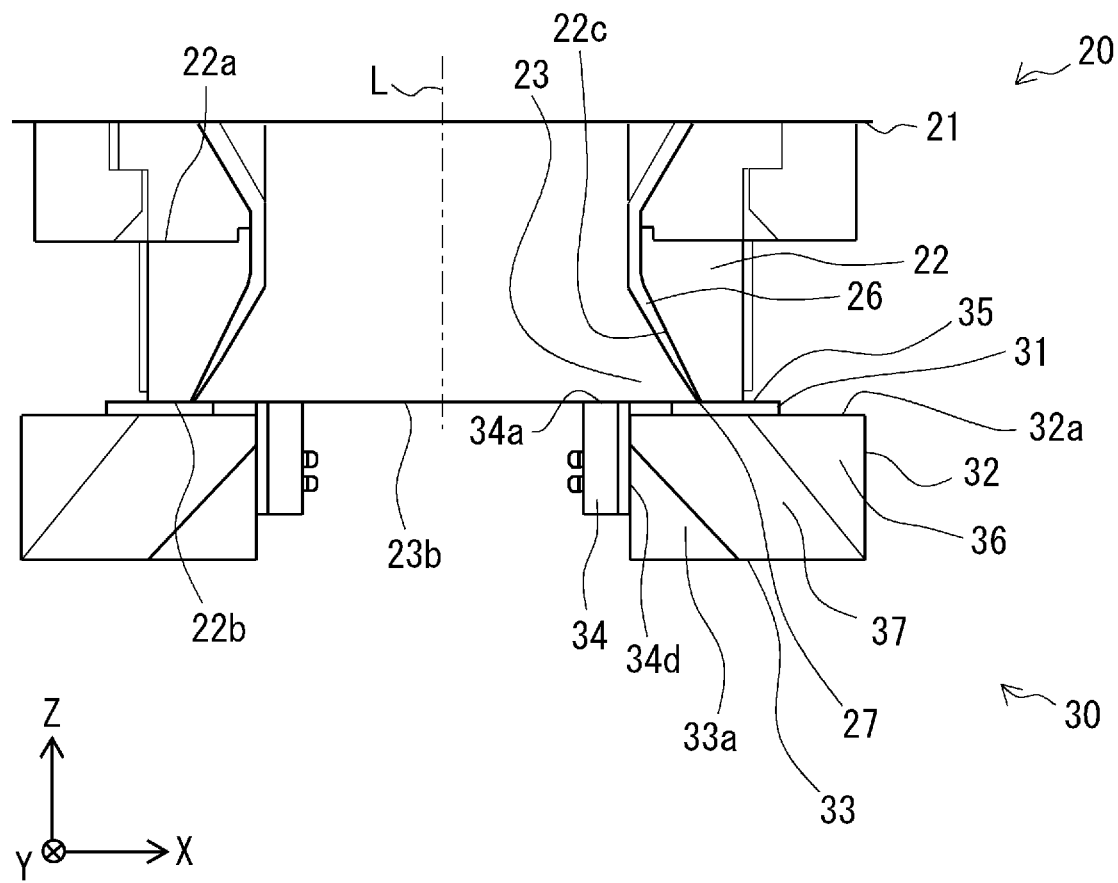
FIG. 3 shows an example of a parison separation device according to an embodiment in a state in which a discharge of parison is stopped.
Figure 4:
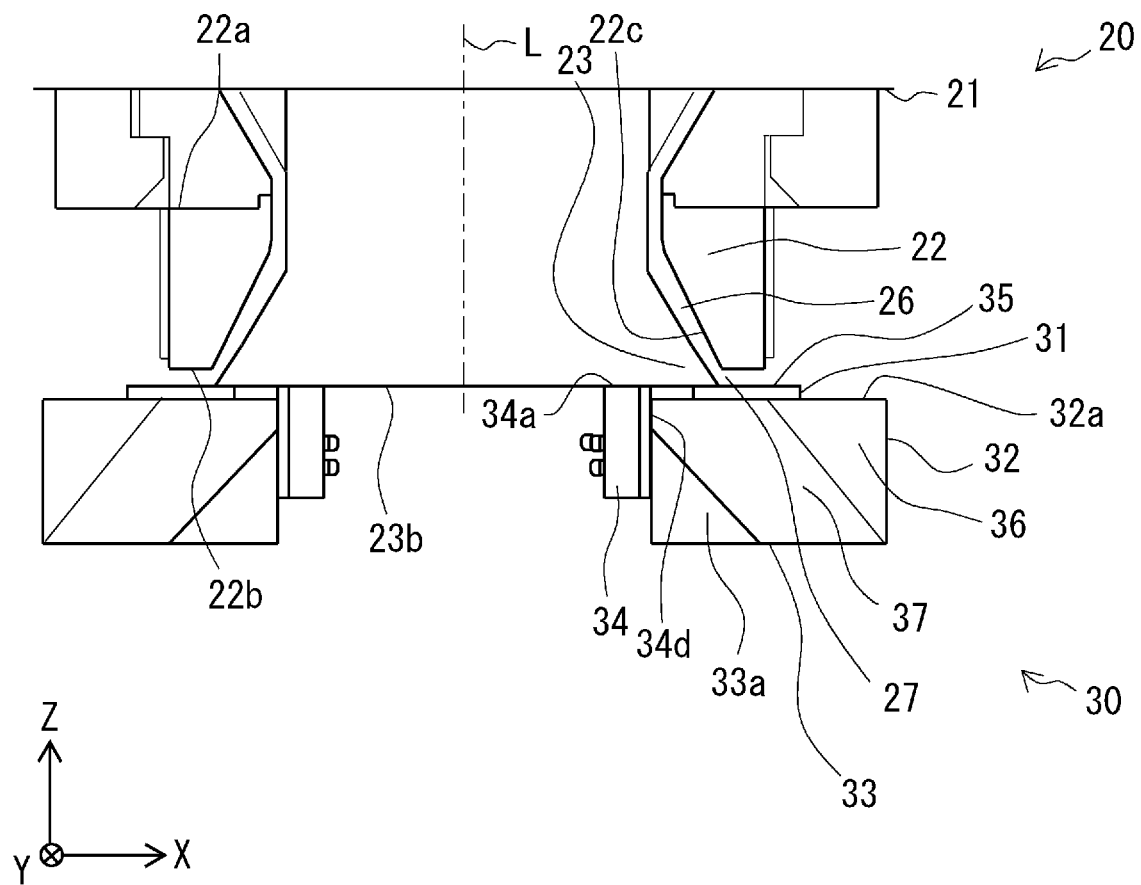
FIG. 4 shows an example of a parison separation device according to an embodiment in a state in which parison is being discharged.
Figure 5:
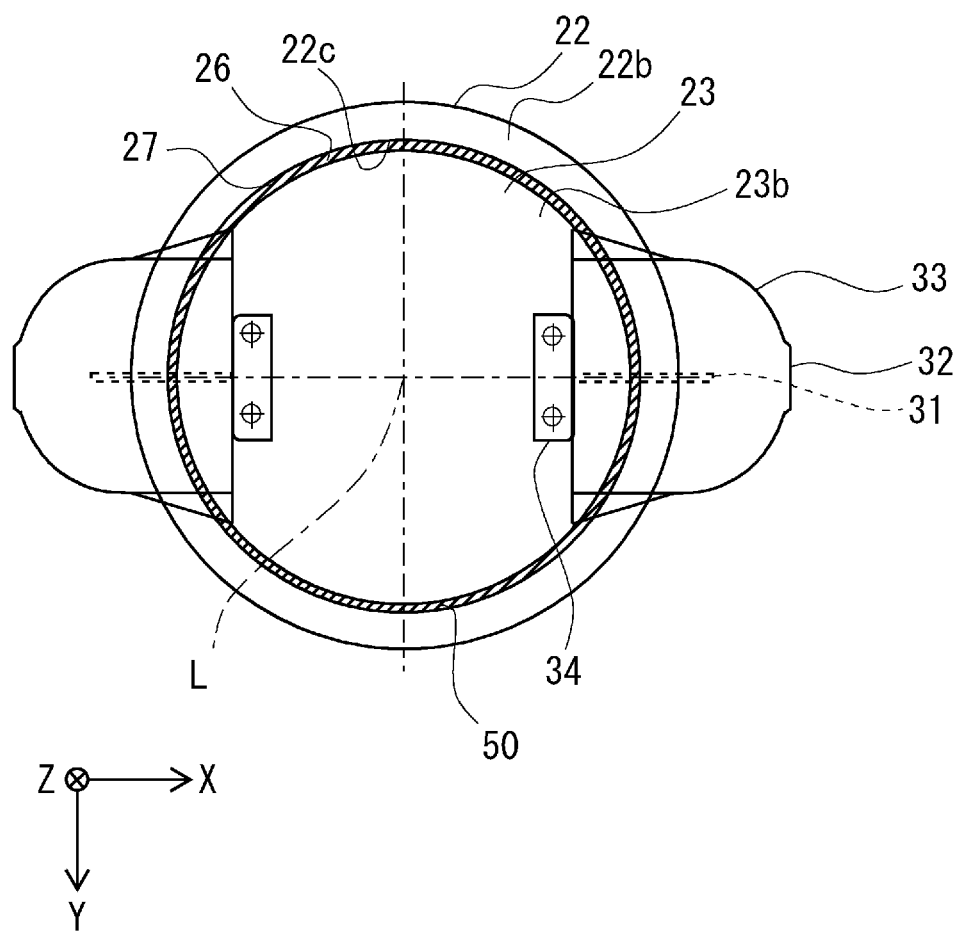
FIG. 5 is a bottom view showing an example of a parison separation device according to an embodiment.

Firstly, a blow molding machine according to an embodiment is described. FIG. 1 is a configuration diagram showing an example of a blow molding machine according to the embodiment. FIGS. 2A and 2B are side views showing examples of a head of the blow molding machine and a parison separation device according to the embodiment. FIGS. 3 and 4 show examples of the parison separation device according to the embodiment. In particular, FIG. 3 shows a state in which a discharge of a parison is stopped and FIG. 4 shows a state in which a parison is being discharged. FIG. 5 is a bottom view showing an example of the prison separation device according to the embodiment.

Figure 6:
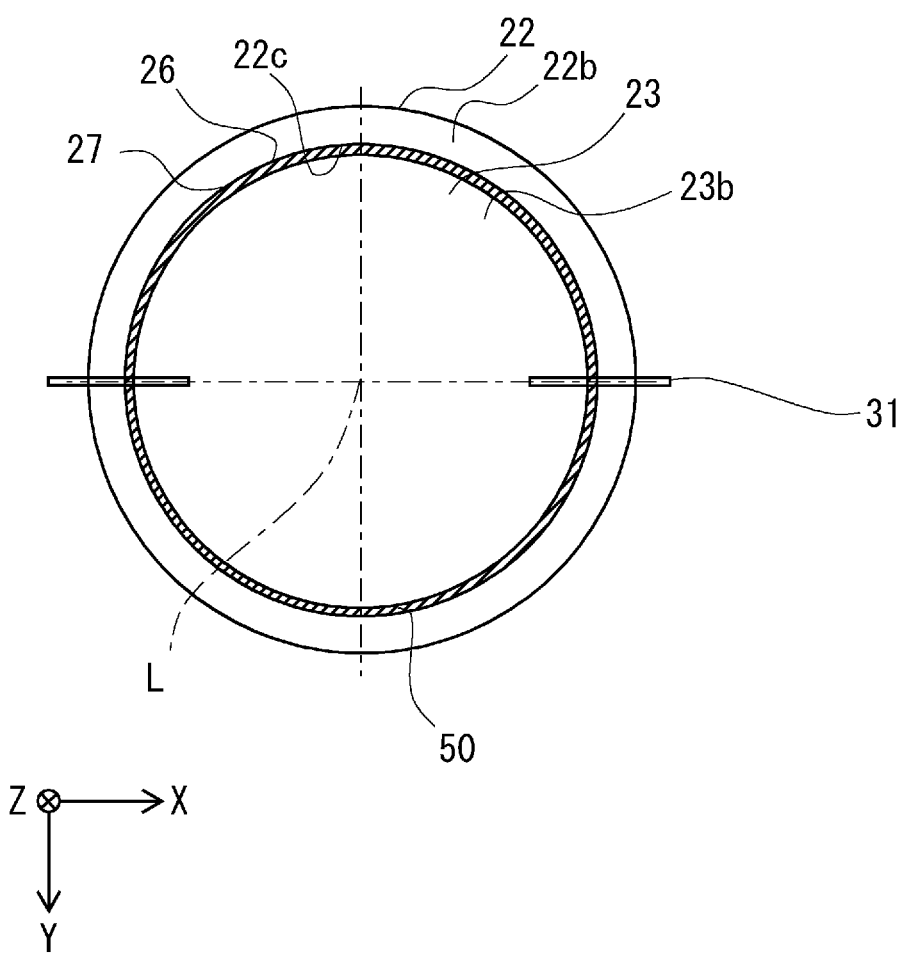
FIG. 6 is a bottom view showing an example of a head according to an embodiment.
Figure 7:
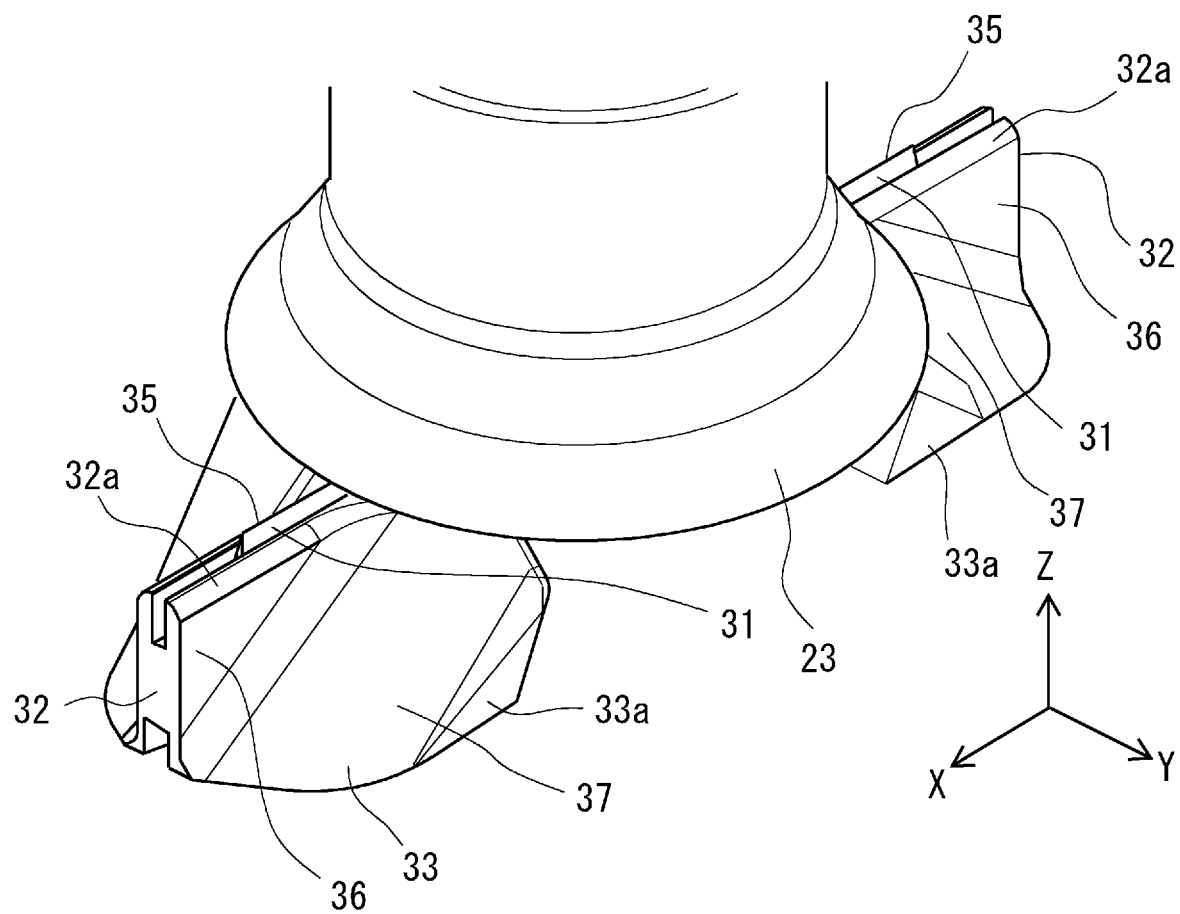
FIG. 7 is a perspective view showing an example of a parison separation device according to an embodiment.

FIG. 6 is a bottom view showing an example of the head of the blow molding machine according to the embodiment. FIG. 7 is a perspective view showing an example of the parison separation device according to the embodiment.

As shown in FIG. 1, a blow molding machine 1 includes an extruder 10, a head 20, a parison separation device 30, and a mold-clamping device 40. The blow molding machine 1 is, for example, an apparatus that manufactures a blow-molded article by a twin-sheet molding method. The twin-sheet molding method is, for example, a type of the internal insert molding method for forming a blow-molded article by molding two thermoplastic resin sheets (plastic sheets). In the blow molding machine 1 according to this embodiment, two thermoplastic resin sheets are formed by the parison separation device 30. Here, an XYZ-orthogonal coordinate axis system is employed for explaining the blow molding machine 1. An XY-plane is a horizontal plane and a Z-axis positive direction is a vertically upward direction. The expression "X-axis direction" indicates a direction, and the expression "X-axis positive direction" or "X-axis negative direction" is used to specify an orientation. Further, the expression "one direction" indicates a direction, and the expression "one direction side" indicates an orientation in one direction.

<Extruder>

The extruder 10 is a screw-type extruder including a cylinder 11, a screw 12, a speed reducer 13, a motor 14, an adaptor 15, and a hopper 16. The cylinder 11 is a cylindrical component extending in the X-axis direction and has a hollow part formed inside thereof. The screw 12 is housed in the cylinder 11.

The screw 12 is inserted into the cylinder 11 from an opening thereof on the X-axis negative direction side. A base part of the screw 12 on the X-axis negative direction side projects from the opening of the cylinder 11 to the outside thereof and is connected to the speed reducer 13 and the motor 14. The screw 12 is rotated by a power source of the motor 14 adjusted by the speed reducer 13.

The opening of the cylinder 11 on the X-axis positive direction side is connected to the head 20 with the adaptor 15 interposed therebetween. The hopper 16 is disposed above an end part of the cylinder 11 on the X-axis negative direction side. The hopper 16 serves as a charging port for charging resin pellets 51, which are a raw material for a parison 50, into the cylinder 11.

The resin pellets 51 supplied from the hopper 16 are pushed from the base part of the rotating screw 12 toward the tip thereof on the opposite side, i.e., pushed out in the X-axis positive direction. The resin pellets 51 melt inside the cylinder 11 by heat from a heater attached to the cylinder and change into a molten resin 52. The molten resin 52 is sent to the head 20 through the opening of the cylinder 11 on the X-axis positive direction side and the adaptor 15. As described above, the extruder 10 extrudes the molten resin 52 and supplies the parison 50 to a gap between the die 22 and the core 23 of the head 20.

<Head>

The head 20 includes a head main body 21, a die 22, a core 23, a spindle 24, and a thickness adjustment device 25. The head main body 21 is a cylindrical housing extending in the vertical direction (Z-axis direction). A central axis L of the head 20 is in the Z-axis direction. The adaptor 15 is connected to an upper part of a side surface of the head main body 21. Further, the die 22 and the core 23 are disposed below the head main body 21. The head main body 21 sends the molten resin 52 sent from the extruder 10 to the gap between the die 22 and the core 23.

As shown in FIGS. 1 to 4, the die 22 is disposed below the head main body 21. The die 22 is a roughly columnar component and has a central axis L. The die 22 includes a through hole 22c that extends from a top surface 22a to a bottom surface 22b, and has a truncated cone shape in which a diameter of the bottom is larger than that of the top. The core 23 is inserted inside the through hole 22c of the die 22. The core 23 is a component that has a central axis L and has a roughly truncated cone shape in which a diameter of the bottom is larger than that of the top. A gap is formed between the die 22 and the core 23. Note that the through hole 22c may have a truncated cone shape in which a diameter of the bottom is smaller than that of the top. Further, the core 23 may be a component having a truncated cone shape in which a diameter of the bottom is smaller than that of the top.

As shown in FIG. 1, the spindle 24 is a columnar component extending in the Z-axis direction. A lower end of the spindle 24 is connected to a top surface 23a of the core 23. An upper end of the spindle 24 is connected to the thickness adjustment device 25. The thickness adjustment device 25 vertically moves the core 23 inside the through hole 22c by vertically moving the spindle 24. By vertically moving the core 23 inside the through hole 22c, it is possible to change a width of the gap between the die 22 and the core 23.

For example, as shown in FIG. 3, when a bottom surface 23b of the core 23 is made to coincide with a bottom surface 22b of the die 22, the gap between the die 22 and the core 23 becomes zero, i.e., the gap is closed. In contrast to this, as shown in FIG. 4, the width of the gap can be increased by bringing the bottom surface 23b of the core 23 lower than the bottom surface 22b of the die 22. The shape of the core 23 is adjusted so that the width of the gap can be adjusted as described above.

The gap between the die 22 and the core 23 serves as a resin flow channel 26. A discharging port 27 for discharging a parison 50 is defined by the gap between the die 22 and the core 23 at the bottom surface 22b of the die 22. Therefore, the cross-sectional shape of the parison 50 is defined by the die 22 and the core 23. By vertically moving the core 23 by using the thickness adjustment device 25, the width of the discharging port 27 changes, so that the thickness of the parison 50 on the cross section changes.

The discharging port 27 has an annular shape. The annular discharging port 27 has a central axis L. Therefore, when the parison 50 is discharged from the gap between the die 22 including the through hole 22c and the core 23 inserted inside the through hole 22c, the central axis L of the annular discharging port 27 is in a direction parallel to the Z-axis direction (vertical direction).

<Parison Separation Device>

As shown in FIGS. 1 to 7, for example, two parison separation devices 30 are attached below the head 20. The two parison separation devices 30 are arranged so that the central axis L of the head 20 becomes their symmetry axis. For example, the parison separation devices 30 are disposed on the X-axis positive and negative direction sides, respectively, as viewed from the central axis L. As described above, by arranging the two parison separation devices 30 so that the central axis L of the head 20 becomes their symmetry axis, the cylindrical parison 50 discharged from the head 20 is divided into two pieces. Note that the cylindrical parison 50 may be formed into one sheet by disposing one parison separation device 30 below the head 20, or formed into three or more sheets by disposing three or more parison separation devices 30 below the head 20.

Each parison separation device 30 includes a cutter 31 and a block 33. The block 33 includes a main body part 33a with an inclined surface 37 formed therein, a cutter support part 32, and an attachment part 34. Each parison separation device 30 forms a sheet 53 by cutting and separating the parison 50 discharged from the gap between the die 22 and the core 23. Among the parison separation devices 30, the parison separation device 30 located on the X-axis positive direction side is described. The parison separation devices located on the X-axis negative and positive direction sides, respectively, are symmetrical with respect to the central axis L.

As shown in FIGS. 2A to 7, the cutter 31 includes a cutting edge 35 extending in the X-axis direction (one direction). The one direction side in which the cutting edge 35 of the cutter 31 extends is a radial direction from the central axis L of the discharging port 27 toward the outer side on a plane orthogonal to the central axis L. The cutter 31 is disposed so that the cutting edge 35 faces in the Z-axis positive direction (i.e., faces upward). A thickness direction of the cutting edge 35 of the cutter 31 is in the Y-axis direction.

The cutter 31 is disposed on a discharging direction side of the discharging port 27. The discharging direction is in the downward direction, i.e., in the Z-axis negative direction. For example, an upper end of the cutting edge 35 of the cutter 31 is in contact with the bottom surface 23b of the core 23. Further, the cutter 31 is disposed so as to cross the discharging port 27 in the width direction. For example, the cutter 31 crosses the discharging port 27 in the width direction from an outer periphery of the bottom surface 23b of the core 23 and extends downward to below the bottom surface 22b of the die 22. By disposing the cutter 31 as described above, the cutter 31 cuts the parison 50 discharged from the discharging port 27. Note that the upper end of the cutting edge 35 of the cutter 31 does not have to be in contact with the bottom surface 23b of the core 23.

The cutter 31 is attached to an upper part of the block 33. For example, the cutter 31 is disposed on a top surface 32a of the cutter support part 32. The cutter support part 32 extends in the X-axis direction (one direction) and has a plate-like shape in which a plate surface 36 faces in the Y-axis direction (thickness direction). The cutter 31 is disposed on the top surface 32a extending in the X-axis direction. For example, the cutter 31 is supported in a groove formed in the top surface 32a of the cutter support part 32. The cutting edge 35 of the cutter 31 is positioned above the top surface 32a of the cutter support part 32. On the top surface 32a of the cutter support part 32, a tapered part that is inclined increasingly downward as it recedes from the cutter 31 is formed in each of the Y-axis positive and negative directions.

The main body part 33a of the block 33 has, for example, a beak-like shape as if a roughly triangular prism whose bottom surface is roughly a right triangle is laid on its side. The bottom surface of the block 33 and the end surface thereof on the X-axis negative direction side are, for example, orthogonal to each other. The top surface includes the inclined surface 37. The inclined surface 37 may be curved. That is, the inclined surface 37 may include an inclined-and-curved surface that is curved and inclined. At the tip on the X-axis positive direction side, the bottom surface and the inclined surface 37 form an acute angle. The main body parts 33a of the blocks 33 are arranged so that they sandwich the cutter 31 from both sides of the cutter 31 in the Y-axis direction, i.e., from the Y-axis positive and negative direction sides. Specifically, the main body parts 33a of the blocks 33 are arranged so that they sandwich the cutter 31 through the plate surfaces 36 on the Y-axis positive and negative direction sides of the cutter support part 32.

As viewed from the Y-axis direction, the main body part 33a of the block 33 has a roughly right triangular shape and is contained inside an outline of the cutter support part 32 having a roughly rectangular shape. That is, the upper end of the main body part 33a of the block 33 is at the same height as the top surface 32a of the cutter support part 32, and the end surface of the main body part 33a of the block 33 on the X-axis negative direction side coincides with the end surface of the cutter support part 32 on the X-axis negative direction side. The bottom surface of the main body part 33a of the block 33 coincides with the bottom surface of the cutter support part 32, and the tip of the main body part 33a of the block 33 on the X-axis positive direction side coincides with the end surface of the cutter support part 32 on the X-axis positive direction side. Since the top surface of the main body part 33a of the block 33 includes the inclined surface 37, the plate surface 36 of the cutter support part 32 on the X-axis positive direction side is exposed. The plate surface 36 of the cutter support part 32 is exposed more as it gets closer to the X-axis positive direction side end.

In the main body part 33a of the block 33, the inclined surface 37 including a component that is inclined increasingly downward as it gets closer to the X-axis positive direction side end is formed. Further, the inclined surface 37 includes a component that is inclined increasingly downward as it recedes from the cutter 31 in each of the Y-axis positive and negative directions. By being equipped with the inclined surface 37 as described above, the block 33 separates the parison 50, which has been cut by the cutter 31, and forms it into a sheet 53.

The block 33 and the cutter 31 are positioned below the head 20 from which the high-temperature parison 50 is discharged, and are configured so that heat from the parison 50 is not conducted thereto until the parison 50 is cut. Therefore, the block 33 and the cutter 31 have temperatures lower than the temperature of the molten resin 52. Further, it is conceivable that when the parison 50 is cut and separated, since the inclined surface 37 of the block 33 has a large area that is in contact with the sheet 53, the temperature of the sheet 53 falls and thereby affects the subsequent processing. Therefore, as shown in FIG. 2A, a heating part 46e such as a high-temperature fluid or a heater is attached to the cutter 31 and the block 33 includes a temperature adjustment unit 46f such as a temperature adjustment device. In this way, it is possible to prevent the temperature of the sheet 53 from falling. A parison conveyance robot 45b holds the sheet 53 whose length has reached a predetermined length with a conveyance band 46h and cuts the held sheet 53 by using a cutter 46g.

As shown in FIGS. 3 and 4, the attachment part 34 is, for example, a component having a rectangular parallelepiped shape. A top surface 34a of the attachment part 34 is attached to the bottom surface 23b of the core 23. A side surface 34d of the attachment part 34 is connected to the X-axis negative direction side (the opposite side to the one direction side) of the cutter support part 32 and to the X-axis negative direction side (the opposite side to the one direction side) of the block 33. In this way, the parison separation device 30 can be attached to the bottom surface 23b of the core 23.

Note that the parison separation device 30 on the X-axis positive direction side as viewed from the central axis L has been described above. The description above may be applied to the parison separation device 30 on the X-axis negative direction side as viewed from the central axis L by reversing the X-axis direction in each component/structure in the description.

<Mold-Clamping Device>

The mold-clamping device 40 forms a blow-molded article by using the sheet(s) 53. For example, the mold-clamping device 40 forms a blow-molded article containing an internal component(s) inside thereof. As shown in FIG. 1, the mold-clamping device 40 includes a pair of dies 41a and 41b, a pair of movable platens 42a and 42b, a hydraulic cylinder 43, and an intermediate die 44. The mold-clamping device 40 further includes a base 46a, a liner guide 46b, and a tie-bar 46c.

The dies 41a and 41b are fixed to the movable platens 42a and 42b, respectively. The movable platens 42a and 42b are attached above the base 46a with the linear guide 46b interposed therebetween. Therefore, the movable platens 42a and 42b can slide in the X-axis positive and negative directions through the linear guide 46b. As the movable platens 42a and 42b slide in the X-axis positive and negative directions, the dies 41a and 41b are opened and closed. FIG. 1 shows a state in which the dies 41a and 41b are opened.

When the dies 41a and 41b are moved, the movable platen 42b is moved along the tie-bar 46c by driving the hydraulic cylinder 43 and hence a pressure is applied across the dies 41a and 41b. The intermediate die 44 is used to form a blow-molded article that is divided into two pieces for putting an internal component(s) inside the blow-molded article. An intermediate-die conveyance robot 45a may be used for conveying the intermediate die 44.

<Method for Manufacturing Hollow-Molded Article: Cutting/Separation of Parison>

Figure 8:
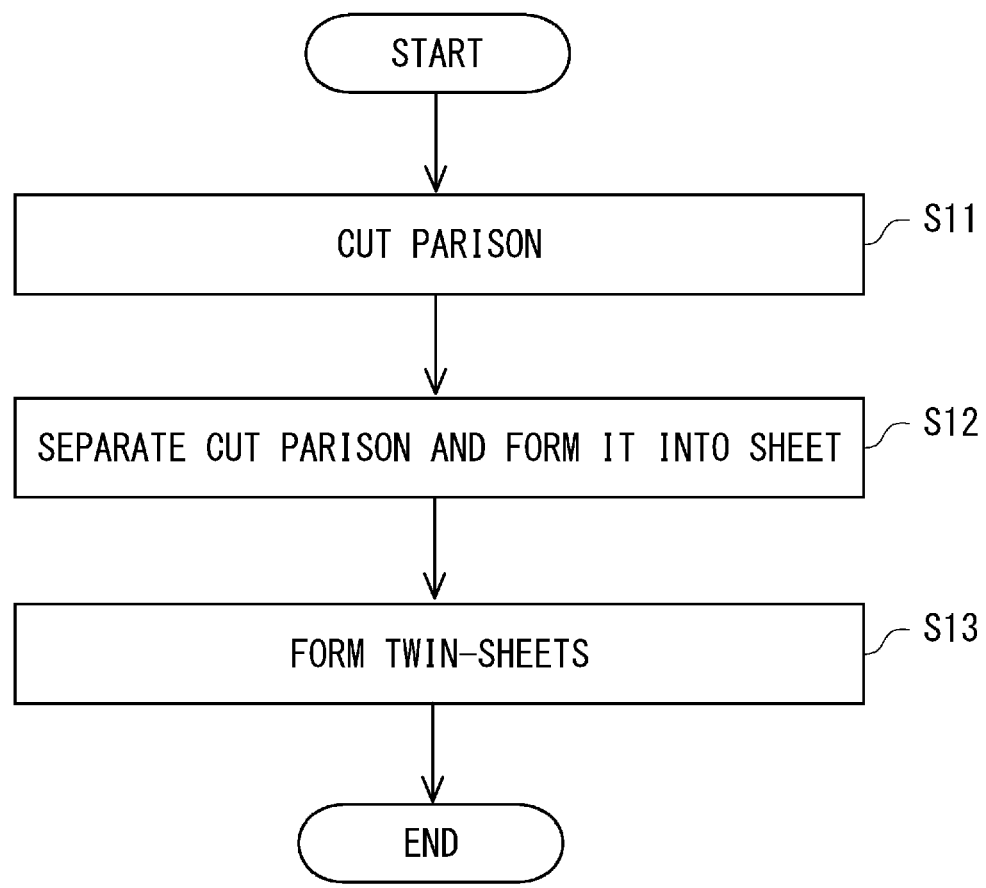
FIG. 8 is a flowchart showing an example of a method for manufacturing a blow-molded article by using a blow molding machine according to an embodiment.

Next, a method for manufacturing a blow-molded article by using a blow molding machine 1 according to an embodiment is described. FIG. 8 is a flowchart showing an example of a method for manufacturing a blow-molded article by using a blow molding machine 1 according to an embodiment.

Firstly, as indicated by a step S11 in FIG. 8, a parison 50 is cut. Specifically, as shown in FIG. 1, a flowing direction of a molten resin 52 extruded from the extruder 10 in the X-axis positive direction is changed to a vertically downward direction (Z-axis negative direction) in the head 20. Then, as shown in FIG. 4, the molten resin 52 is pushed out from the gap between the die 22 including the through hole 22c and the core 23 inserted inside the through hole 22c so that the molten resin 52 is discharged as a parison. As a result, a cylindrical parison 50 is discharged from the annular discharging port 27.

As shown in FIGS. 3 to 7, the parison separation device 30 is disposed below the die 22 and the core 23. For example, two parison separation devices 30 are arranged so as to be symmetrical with respect to the central axis L. The parison separation device 30 includes the cutter 31 and the block 33. In the cuter 31, the cutting edge 35 extending in one direction faces upward. The cutter 31 is attached to an upper part of the block 33. The main body parts 33a of the blocks 33 are arranged so that they sandwich the cutter 31 from both sides in the thickness direction of the cutting edge 35. In the block 33, the inclined surface 37 including a component that is inclined increasingly downward as it gets closer to the one direction side end is formed.

Therefore, the cutter 31 is configured so that the one direction side in which the cutting edge 35 of the cutter 31 extends is in a radius direction from the central axis L toward the outer side. The central axis L is a central axis of the annular discharging port 27 and is in a direction parallel to the vertical direction. Further, the cutter 31 is disposed on the discharging direction side of the discharging port 27. For example, the upper end of the cutting edge 35 of the cutter 31 is made to coincide with the bottom surface 23b of the core 23. At the same time, the cutter 31 is disposed so as to cross the discharging port 27 in the width direction. By disposing the cutter 31 as described above, the cutter 31 cuts the cylindrical parison 50 discharged from the discharging port 27. For example, the cylindrical parison 50 is divided into two pieces by two parison separation devices 30. Note that the upper end of the cutting edge 35 of the cutter 31 does not have to coincide with the bottom surface 23b of the core 23.

Next, as indicated by a step S12 in FIG. 8, the cut parison 50 is separated by using the block 33 including the inclined surface 37 and formed into a sheet 53. Specifically, as shown in FIGS. 2A and 2B, the cut parison 50 reaches the inclined surface 37 of the block 33 in the parison separation device 30. As described above, by disposing the inclined surfaces 37 on both sides of the cutter 31, the block 33 separates the cut parison 50 and forms it into a sheet 53.

<Method for Manufacturing Hollow-Molded Article: Twin-Sheet Molding>

Figure 9:
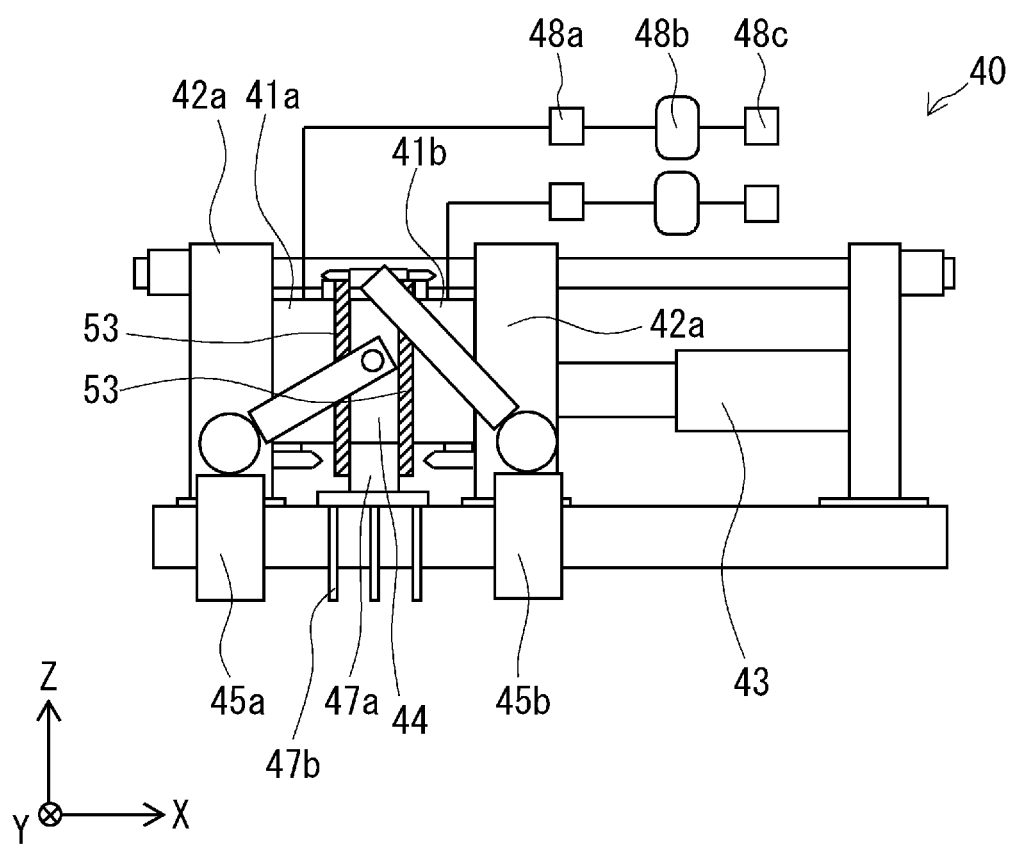
FIG. 9 is a diagram showing an example of a step in twin-sheet molding according to an embodiment.

Next, as indicated by a step S13 in FIG. 8, twin-sheet molding is performed by using two sheets. FIGS. 9 to 12 are diagrams showing examples of steps in twin sheet molding according to an embodiment. As shown in FIG. 9, each of the sheets 53 is disposed on a respective one of the pair of dies 41a and 41b of the mold-clamping device 40. A parison conveyance robot 45b may be used to dispose each of the sheets 53. Then, by performing pre-blowing on the surfaces of the sheets 53 disposed on the surfaces of the respective dies 41a and 41b, they are pressed against the respective dies 41a and 41b.

Next, the intermediate die 44 is disposed between these sheets 53 pressed against the pair of dies 41a and 41b. When the intermediate die 44 is disposed between the sheets 53, the intermediate die 44 may be disposed above an intermediate-die placement table 47a. Further, a four-axis expansion 47b may be used to adjust the shape of the end of each sheet 53. After the intermediate die 44 is disposed, the dies 41a and 41b are pressed from both sides together with the sheets 53. In order to perform internal inserting and second mold-clamping, they are evacuated by a vacuum motor 48c through a solenoid valve 48a and a vacuum tank 48b so that the dies 41a and 41b suck the respective sheets 53.

Figure 10:
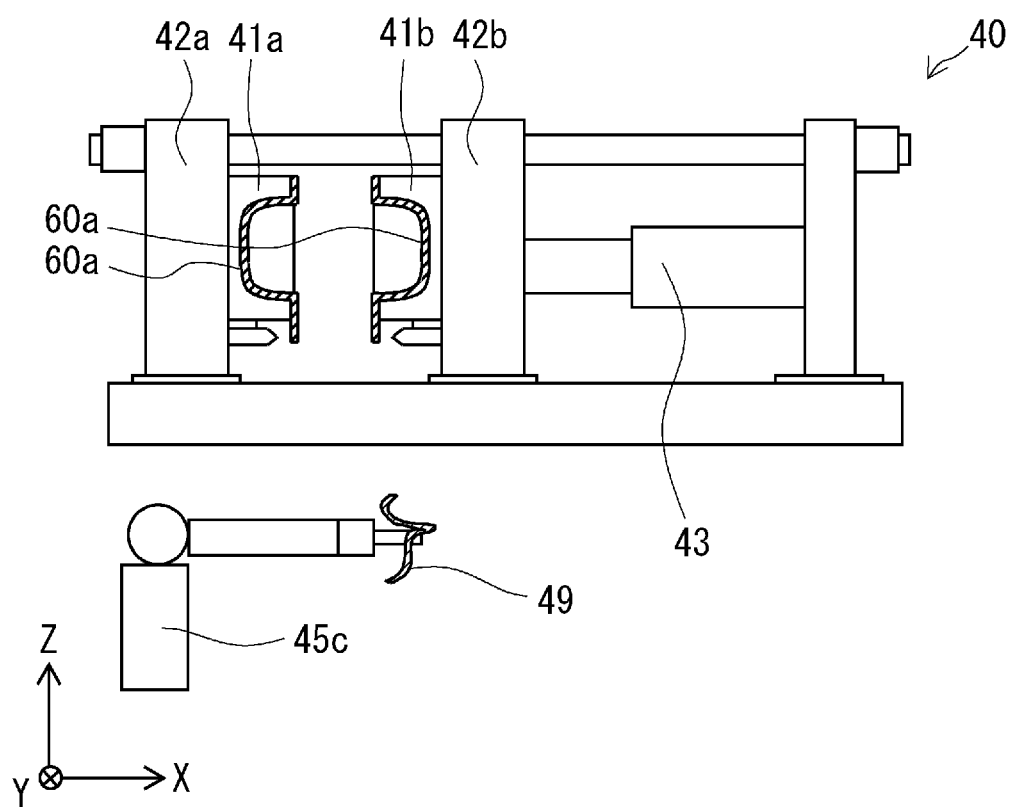
FIG. 10 is a diagram showing an example of a step in twin-sheet molding according to an embodiment.

As a result, a blow-molded article 60a divided into two pieces is formed as shown in FIG. 10. Next, the pair of dies 41a and 41b of the mold-clamping device 40 are separated from the intermediate die 44 and the intermediate die 44 is removed. Then, an internal component(s) 49 to be contained inside the blow-molded article 60 is placed in an area that will become the internal space of the blow-molded article 60a, which has been divided into two pieces. For example, the internal component 49 is disposed by using an insert conveyance robot 45c.

Figure 11:
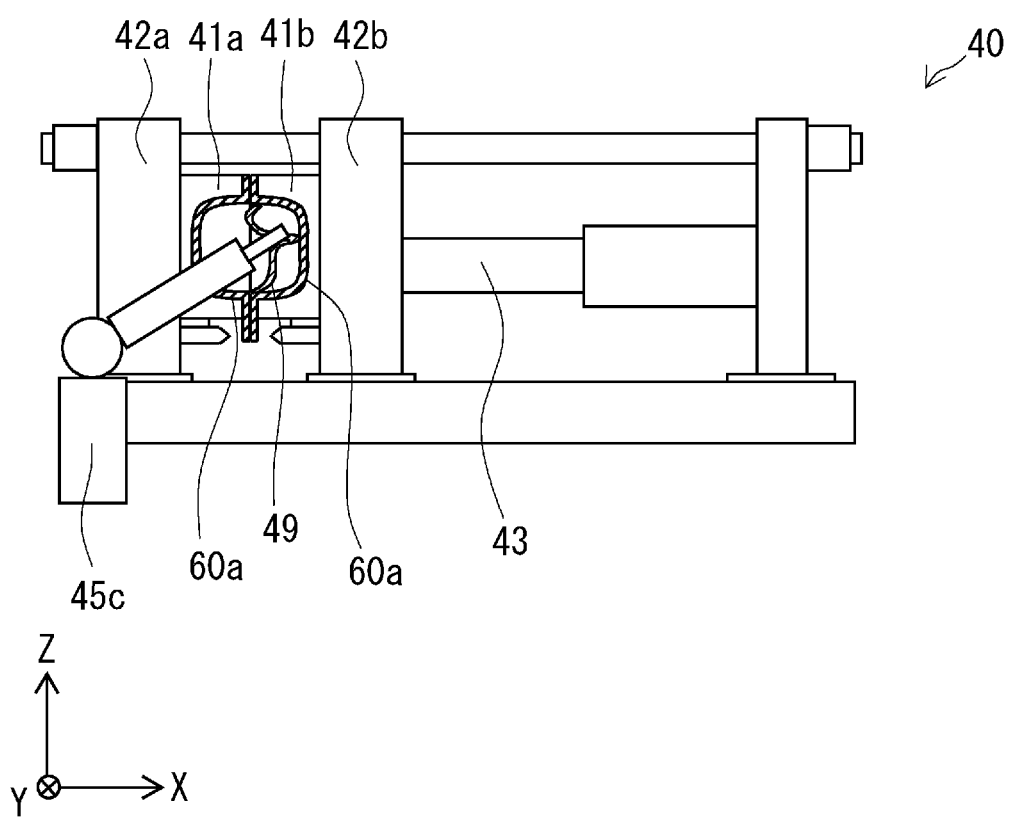
FIG. 11 is a diagram showing an example of a step in twin-sheet molding according to an embodiment.
Figure 12:
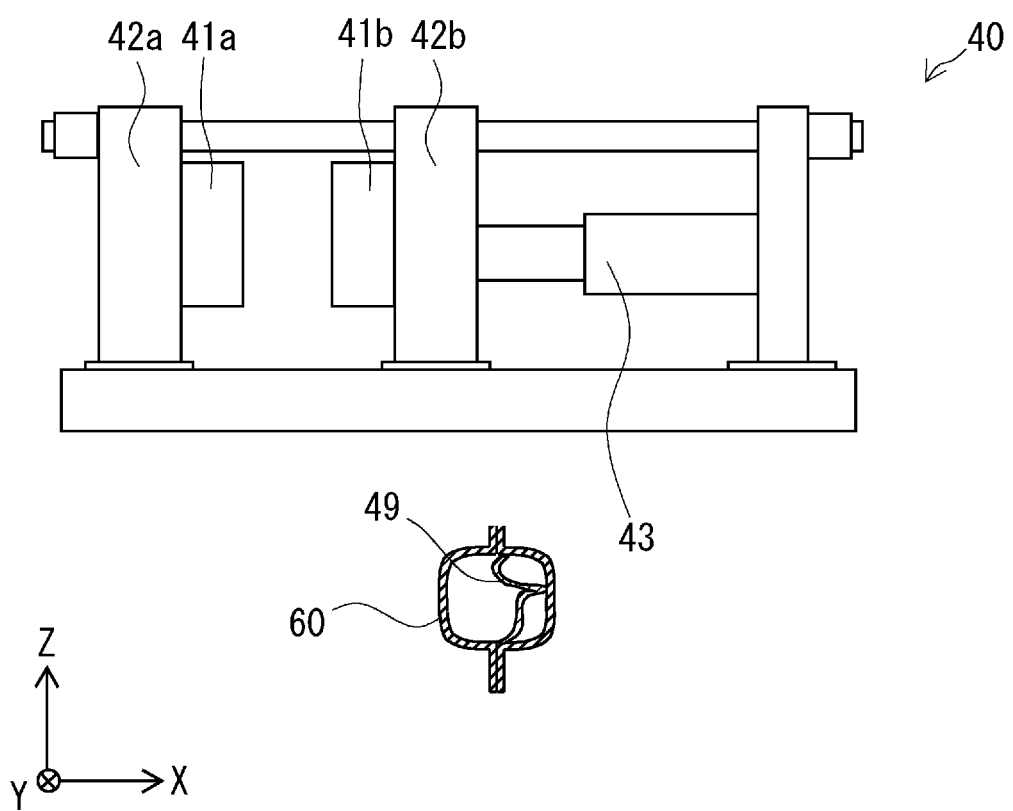
FIG. 12 is a diagram showing an example of a step in twin-sheet molding according to an embodiment.

As shown in FIG. 11, after disposing the internal component 49 between the two pieces, which have been obtained by dividing the blow-molded article 60a, the movable platens 42a and 42b are moved by the hydraulic cylinder 43 and hence a pressure is applied across the molds 41a and 41b. As a result, as shown in FIG. 12, a blow-molded article 60 containing the internal component 49 inside thereof is formed. By removing the formed blow-molded article 60 from the dies 41a and 41b, the twin-sheet molding is finished.

Next, a comparative example is described before describing the advantageous effect of this embodiment. Then, the advantageous effect of this embodiment will be described in comparison with the comparative example.

COMPARATIVE EXAMPLE

Figure 13:
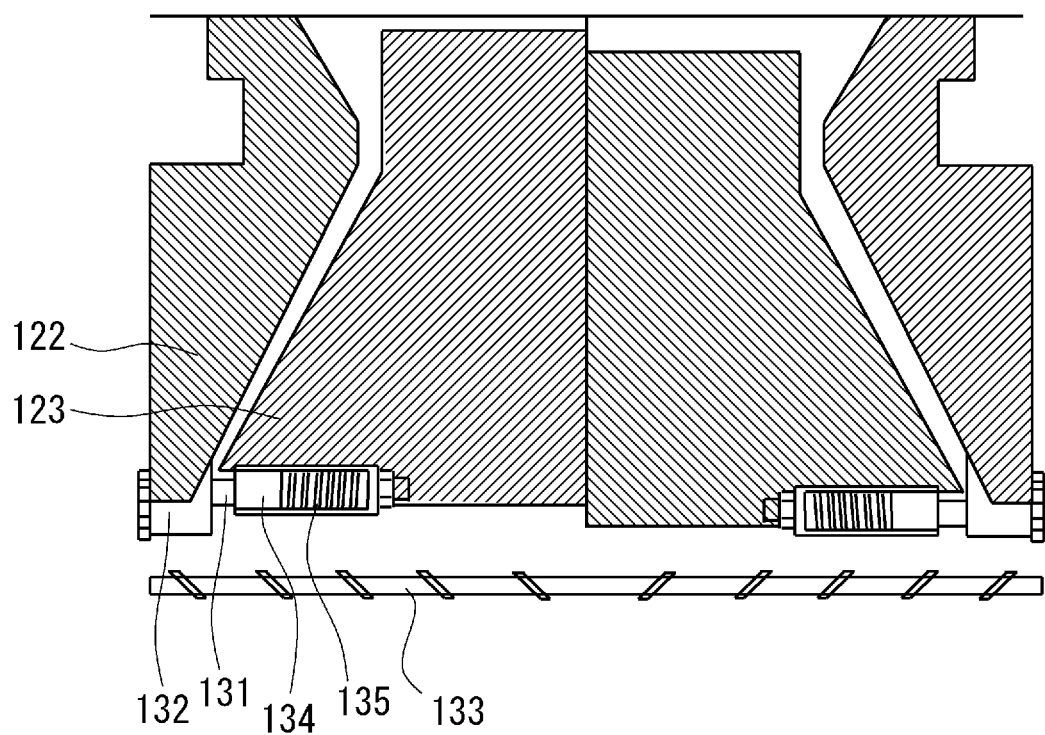
FIG. 13 is a cross section showing an example of a die and a core of a blow molding machine according to a comparative example.
Figure 14:
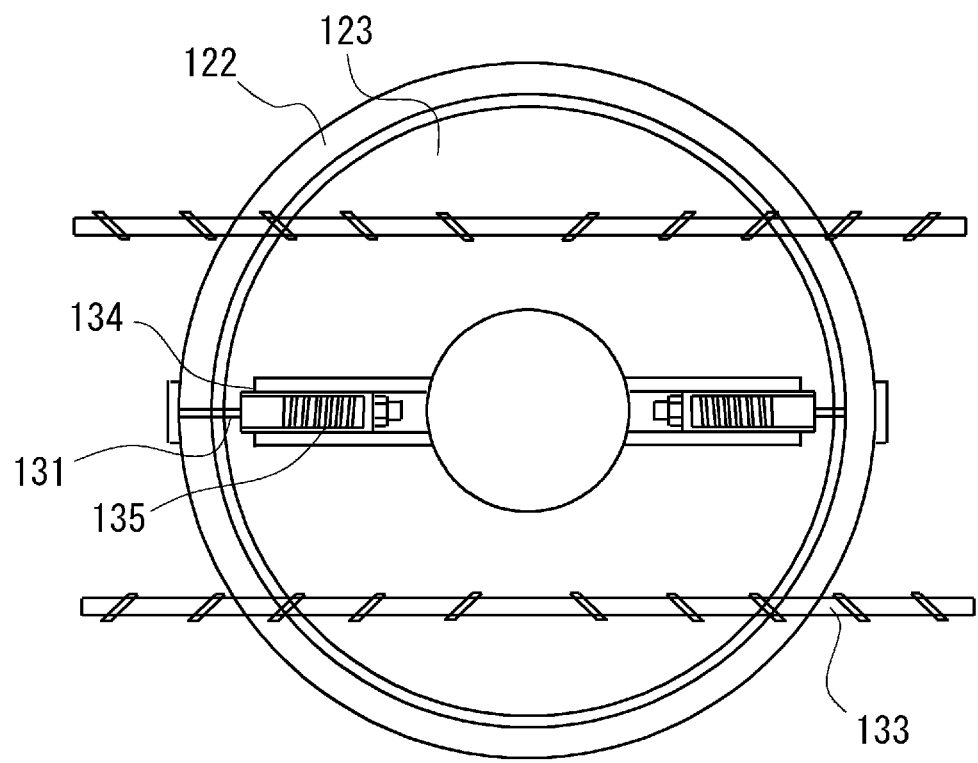
FIG. 14 is a bottom view showing the example of the die and the core of the blow molding machine according to the comparative example.

FIG. 13 is a cross section showing an example of a die 122 and a core 123 of a blow molding machine 101 according to a comparative example. FIG. 14 is a bottom view showing the example of the die 122 and the core 123 of the blow molding machine 101 according to the comparative example. A left side of FIG. 13 shows a state in which the core 123 has been moved upward, and a right side of FIG. 13 shows a state in which the core 123 has been moved downward.

As shown in FIGS. 13 and 14, in the blow molding machine 101 according to the comparative example, a recessed part 134 is formed in the core 123 and a spring 135 is disposed inside the recessed part 134. The spring 135 is used to bring a cutter 131 into contact with a cutter 132 disposed on an inner wall of the die 122. Further, a roller 133 that forms a parison divided into two pieces into a sheet-like shape is provided below the die 122 and the core 123.

In the blow molding machine 101 according to the comparative example, the recessed part 134 in which the spring 135 is disposed is disposed in a resin flow channel. Therefore, there is a possibility that a molten resin may leak through the recessed part 134.

Further, in the comparative example, in order to adjust the thickness of the parison, the width of the gap between the die 122 and the core 123 is changed by vertically moving the core 123. In this case, it is necessary to press the cutter 131 against the cutter 132 by the spring 135 so that no gap is formed between the ends of the cutters 131 and 132. Therefore, its mechanism becomes complicated in which the spring and so on are used, thus increasing the manufacturing cost. Further, the parison, which is divided into two pieces, is stretched by the roller 133 and formed into a sheet. Therefore, the cost is increased because the roller 133 needs to be installed. Further, when the parison, which is divided into two pieces, is formed into the sheet on the roller 133, wrinkles are formed in the sheet.

Next, advantageous effects of this embodiment are described. The parison separation device 30 according to this embodiment is attached so that the cutter 31 is disposed in the bottom surface 23b of the core 23. In this way, the cutter 31 is disposed outside the resin flow channel 26 located between the die 22 and the core 23. For example, the cutter 31 is disposed below the discharging port 27. Therefore, since there is no need to form a recessed part in the die 22 or the core 23, it is possible to prevent the resin from leaking through the recessed part.

Further, since the parison separation device 30 is attached to the bottom surface 23b of the core 23, the structure can be simplified. Therefore, unlike the comparative example, it is possible to adopt a simple structure and thereby reduce the manufacturing cost. Further, since the parison separation device 30 can be attached to various types of dies 22 and cores 23, its versatility can be improved.

Further, the parison separation device 30 according to this embodiment separates the cut parison 50 by the block 33 including the inclined surface 37, and thereby forms it into a sheet 53. Therefore, unlike the comparative example, it is possible to eliminate the need for components such as the roller and thereby to simplify the structure. Further, since the sheet 53 can be stretched by the inclined surface 37, which is inclined toward the outer side, formation of wrinkles in the sheet 53 can be prevented.

In the block 33, the inclined surface 37 including a component that is inclined increasingly downward as it gets closer to the X-axis positive direction side end is formed. Therefore, it is configured so that the end of the cut parison 50 gradually widens toward the outer side. Therefore, formation of wrinkles in the sheet 53 can be prevented.

Further, the inclined surface 37 of the block 33 includes a component that is inclined increasingly downward as it recedes from the cutter 31 in each of the Y-axis positive and negative directions. Therefore, the cut parison 50 can be gently separated in the Y-axis positive and negative directions and formed into a sheet. Therefore, formation of wrinkles in the sheet 53 can be prevented.

On the top surface 32*a* of the cutter support part 32, a tapered part that is inclined increasingly downward as it recedes from the cutter 31 is formed. Therefore, the cut parison 50 is smoothly moved to the block 33, thus making it possible to prevent the sheet from lying on top of one another near the cutter 31.

Since the top surface of the block 33 is formed as the inclined surface 37, the plate surface 36 of the cutter support part 32 on the X-axis positive direction side is exposed. Therefore, the cut parison 50 is smoothly moved to the block 33, thus making it possible to prevent the sheet from lying on top of one another near the cutter 31.

The upper end of the cutting edge 35 of the cutter 31 is in contact with the bottom surface 23*b* of the core 23. Therefore, the parison 50 can be cut immediately after being discharged from the discharging port 27. In this way, it is possible to prevent the parison 50 discharged from the discharging port 27 from being twisted due to a reaction force from the cutter 31 and thereby from being displaced, and hence to improve the accuracy of the cutting place of the parison 50.

The present invention made by the inventors of the present application has been explained above in a concrete manner based on the embodiments. However, the present invention is not limited to the above-described embodiments, and needless to say, various modifications can be made without departing from the spirit and scope of the present invention.

This application is based upon and claims the benefit of priority from Japanese patent application No. 2017-027648, filed on Feb. 17, 2017, the disclosure of which is incorporated herein in its entirety by reference.

REFERENCE SIGNS LIST

1, 101 BLOW MOLDING MACHINE
10 EXTRUDER
11 CYLINDER
12 SCREW
13 SPEED REDUCER
14 MOTOR
15 ADAPTOR
16 HOPPER
20 HEAD
21 HEAD MAIN BODY
22, 122 DIE
22*a* TOP SURFACE
22*b* BOTTOM SURFACE
22*c* THROUGH HOLE
23, 123 CORE
23*a* TOP SURFACE
23*b* BOTTOM SURFACE
24 SPINDLE
25 THICKNESS ADJUSTMENT DEVICE
26 RESIN FLOW CHANNEL
27 DISCHARGING PORT
30 PARISON SEPARATION DEVICE
31, 131, 132 CUTTER
32 CUTTER SUPPORT PART
32*a* TOP SURFACE
33 BLOCK
34 ATTACHMENT PART
34*a* TOP SURFACE
34*d* SIDE SURFACE
35 CUTTING EDGE
36 PLATE SURFACE
37 INCLINED SURFACE
40 MOLD-CLAMPING DEVICE
41*a*, 41*b* DIE
42*a*, 42*b* MOVABLE PLATEN
43 HYDRAULIC CYLINDER
44 INTERMEDIATE DIE
45*a* INTERMEDIATE DIE CONVEYANCE ROBOT
45*b* PARISON CONVEYANCE ROBOT
45*c* INSERT CONVEYANCE ROBOT
46*a* BASE
46*b* LINER GUIDE
46*c* TIE-BAR
46*e* HEATING PART
46*f* TEMPERATURE ADJUSTMENT UNIT
46*g* CUTTER
46*h* CONVEYANCE BAND
47*a* INTERMEDIATE DIE PLACEMENT TABLE
47*b* FOUR-AXIS EXPANSION
48*a* SOLENOID VALVE
48*b* VACUUM TANK
48*c* VACUUM MOTOR
49 INTERNAL COMPONENT
50 PARISON
51 RESIN PELLET
52 MOLTEN RESIN
53 SHEET
60 BLOW-MOLDED ARTICLE
60*a* BLOW-MOLDED ARTICLE DIVIDED INTO TWO PIECES
133 ROLLER
134 RECESSED PART
135 SPRING
L CENTRAL AXIS

The invention claimed is:

1. A parison separation device comprising:
   a cutter with a cutting edge, the cutting edge extending in a one direction and facing upward; and
   a block, the cutter being attached to an upper part of the block, inclined surfaces being formed on both sides of the block in a thickness direction of the cutting edge, each of the inclined surfaces including a component that is inclined increasingly downward as it gets closer to one direction side end, and an inclined-and-curved surface part, the inclined-and-curved surface part being curved and inclined, and
   wherein the parison separation device is disposed on a discharging direction side of a discharging port for discharging a parison and configured to cut the parison discharged from the discharging port.

2. The parison separation device according to claim 1, wherein
   the one direction side is a radius direction from a central axis toward an outer side in a plane orthogonal to the central axis, the central axis being parallel to a vertical direction in the discharging port, the discharging port having an annular shape when the parison is discharged from a gap between a die including a through hole and a core inserted inside the through hole, the cutter is disposed on the discharging direction side of the discharging port and disposed so as to cross the discharging port, and is configured to cut the parison discharged from the discharging port, and the block separates the cut parison and forms it into a sheet.

3. The parison separation device according to claim 2, wherein the block comprises:
a cutter support part extending in the one direction and has a plate-like shape in which plate surfaces face in the thickness direction, the cutter being disposed on a top surface of the cutter support part extending in the one direction; and
an attachment part with a side surface joined to a side of the block opposite to a side thereof on the one direction side, and
the inclined surfaces are disposed so that they sandwich the cutter through the plate surfaces on both sides of the cutter support part,
a top surface of the attachment part is attached to a bottom surface of the core, and
an upper end of the cutting edge is in contact with the bottom surface of the core.

4. The parison separation device according to claim 3, wherein a tapered part is formed on the top surface of the cutter support part, the tapered part being inclined increasingly downward as it recedes from the cutter in the thickness direction.

5. The parison separation device according to claim 1, wherein each of the inclined surface includes a component that is inclined increasingly downward as it recedes from the cutter in the thickness direction.

6. The parison separation device according to claim 1, wherein a heating unit is attached to the cutter.

7. The parison separation device according to claim 1, wherein the block comprises a temperature adjustment unit.

8. A blow molding machine comprising:
a die including a through hole;
a core inserted inside the through hole;
an extruder configured to extrude a molten resin and thereby supply a parison to a gap between the die and the core;
a parison separation device configured to cut and separate the parison discharged from the gap, and thereby form a sheet; and
a mold-clamping device configured to form a blow-molded article by using the sheet,
wherein the parison separation device comprises:
a cutter with a cutting edge, the cutting edge extending in a one direction and facing upward; and
a block, the cutter being attached to an upper part of the block, inclined surfaces being formed on both sides of the block in a thickness direction of the cutting edge, each of the inclined surfaces including a component that is inclined increasingly downward as it gets closer to one direction side end, and an inclined-and-curved surface part, the inclined-and-curved surface part of being curved and inclined, and the parison separation device is disposed on a discharging direction side of a discharging port for discharging and configured to cut the parison discharged from the discharging port.

9. The blow molding machine according to claim 8, wherein the one direction side is a radius direction from a central axis toward an outer side in a plane orthogonal to the central axis, the central axis being parallel to a vertical direction in the discharging port, the discharging port having an annular shape when the parison is discharged from the gap, the cutter is disposed on the discharging direction side of the discharging port and disposed so as to cross the discharging port, and is configured to cut the parison discharged from the discharging port, and the block separates the cut parison and forms it into the sheet.

10. The blow molding machine according to claim 9, wherein the block of the parison separation device comprises:
a cutter support part extending in the one direction and has a plate-like shape in which plate surfaces face in the thickness direction, the cutter being disposed on a top surface of the cutter support part extending in the one direction; and
an attachment part with a side surface joined to a side of the block opposite to a side thereof on the one direction side, and
the inclined surfaces are disposed so that they sandwich the cutter through the plate surfaces on both sides of the cutter support part,
a top surface of the attachment part is attached to a bottom surface of the core, and
an upper end of the cutting edge is in contact with the bottom surface of the core.

11. The blow molding machine according to claim 10, wherein a tapered part is formed on the top surface of the cutter support part, the tapered part being inclined increasingly downward as it recedes from the cutter in the thickness direction.

12. The blow molding machine according to claim 8, wherein each of the inclined surfaces includes a component that is inclined increasingly downward as it recedes from the cutter in the thickness direction.

13. The blow molding machine according to claim 8, wherein a heating unit is attached to the cutter.

14. The blow molding machine according to claim 8, wherein the block comprises a temperature adjustment unit.

15. A method for manufacturing a blow-molded article, comprising the steps of:
(A) extruding a molten resin so that the molten resin is discharged as a parison from a gap between a die including a through hole and a core inserted inside the through hole, and cutting the discharged parison;
(B) separating the cut parison and forming it into a sheet;
(C) performing twin-sheet molding by using the sheet, wherein
in the step of cutting the parison,
a parison separation device is disposed below the die and the core, the parison separation device comprising:
a cutter with a cutting edge, the cutting edge extending in a one direction and facing upward; and
a block, the cutter being attached to an upper part of the block, inclined surfaces being formed on both sides of the block in a thickness direction of the cutting edge, each of the inclined surfaces including a component that is inclined increasingly downward as it gets closer to one direction side end, and an inclined-and-curved surface part, the inclined-and-curved surface part being curved and inclined.

16. The method for manufacturing a blow-molded article according to claim 15, wherein the one direction side is a radius direction from a central axis toward an outer side in a plane orthogonal to the central axis, the central axis being parallel to a vertical direction in a discharging port for discharging the parison, the discharging port having an annular shape when the parison is discharged from the gap, the cutter is disposed on the discharging direction side of the discharging port and disposed so as to cross the discharging port, and is configured to cut the parison discharged from the discharging port, and in the step of forming the cut parison into the sheet, the block separates the cut parison and forms it into the sheet.

17. The method for manufacturing a blow-molded article according to claim 16, wherein the block of the parison serration device comprising:

a cutter support part extending in the one direction and has a plate-like shape in which plate surfaces face in the thickness direction, the cutter being disposed on a top surface of the cutter support part extending in the one direction; and an attachment part with a side surface to which a side of the block opposite to a side thereof on the one direction side is joined, and the inclined surfaces are configured so that they sandwich the cutter through the plate surfaces on both sides of the cutter support part, the attachment part is attached to a bottom surface of the core, and an upper end of the cutting edge is brought into contact with the bottom surface of the core.

18. The method for manufacturing a blow-molded article according to claim 17, wherein a tapered part is formed on the top surface of the cutter support part, the tapered part being inclined increasingly downward as it recedes from the cutter in the thickness direction.

* * * * *